US008467093B2

(12) United States Patent
Komatsu et al.

(10) Patent No.: US 8,467,093 B2
(45) Date of Patent: Jun. 18, 2013

(54) IMAGE PROCESSING APPARATUS AND COMPUTER PROGRAM PRODUCT STORING IMAGE AND PRINT SETTING INFORMATION ASSOCIATED WITH INDEX USED TO SUPPRESS TONER CONSUMPTION

(75) Inventors: Yasuo Komatsu, Saitama (JP); Kouji Yorimoto, Saitama (JP); Kiyoshi Une, Saitama (JP); Takumi Nishikata, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 559 days.

(21) Appl. No.: 12/754,853

(22) Filed: Apr. 6, 2010

(65) Prior Publication Data
US 2011/0032549 A1 Feb. 10, 2011

(30) Foreign Application Priority Data

Aug. 10, 2009 (JP) .................................. 2009-186114

(51) Int. Cl.
*H04N 1/407* (2006.01)
*H04N 1/60* (2006.01)
(52) U.S. Cl.
USPC .......... 358/1.9; 358/3.24; 358/1.13; 358/521; 358/522; 358/527; 399/27
(58) Field of Classification Search
USPC ............... 358/1.9, 2.1, 3.06, 3.21, 3.24, 3.26, 358/1.13–1.15, 504, 406, 468, 296, 300, 358/518, 520, 521, 522, 527, 530; 399/9, 399/24, 27; 347/14, 19, 112
See application file for complete search history.

(56) References Cited

U.S. PATENT DOCUMENTS

| | | | | |
|---|---|---|---|---|
| 7,061,391 | B2 * | 6/2006 | Hopper et al. | 399/24 |
| 7,280,258 | B2 * | 10/2007 | Kitahara et al. | 347/19 |
| 7,283,258 | B1 * | 10/2007 | Kuno et al. | 358/1.13 |
| 7,925,173 | B2 * | 4/2011 | Yamada | 399/27 |
| 8,116,643 | B2 * | 2/2012 | Nagai | 399/27 |
| 2003/0020951 | A1 * | 1/2003 | Minowa et al. | 358/1.15 |
| 2004/0036897 | A1 * | 2/2004 | Yamauchi | 358/1.9 |
| 2007/0292156 | A1 * | 12/2007 | Eguchi | 399/45 |
| 2011/0032548 | A1 * | 2/2011 | Nishikata et al. | 358/1.9 |
| 2011/0032549 | A1 * | 2/2011 | Komatsu et al. | 358/1.9 |
| 2011/0051156 | A1 * | 3/2011 | Yorimoto et al. | 358/1.9 |
| 2011/0170142 | A1 * | 7/2011 | Ito et al. | 358/3.24 |
| 2012/0050766 | A1 * | 3/2012 | Saiki | 358/1.9 |
| 2012/0092734 | A1 * | 4/2012 | Yamada | 358/518 |
| 2012/0114361 | A1 * | 5/2012 | Nagai | 399/81 |
| 2013/0028616 | A1 * | 1/2013 | Kunihiro et al. | 399/27 |

FOREIGN PATENT DOCUMENTS

JP  A 2007-019727  1/2007

* cited by examiner

*Primary Examiner* — Scott A Rogers
(74) *Attorney, Agent, or Firm* — Oliff & Berridge, PLC

(57) ABSTRACT

An image processing apparatus includes a storage unit that stores image formation information in which print setting information is associated with an index useful in deciding to suppress consumption of a recording material; and an execution unit that executes a process of displaying one or more pieces of the image formation information stored in the storage unit on a display unit in association with print data to be printed.

8 Claims, 14 Drawing Sheets

FIG. 2

DATA STRUCTURE OF IMAGE FORMATION INFORMATION (PRESET)

| |
|---|
| PRESET NAME |
| REDUCED IMAGE DATA |
| IMAGE TYPE (TEXT/TEXT-AND PHOTOGRAPH/PHOTOGRAPH) |
| RGB IMAGE DENSITY |
| RGB HISTOGRAM |
| CMYK IMAGE DENSITY FOR APPLICATION OF DEFAULT SETTING |
| CMYK IMAGE DENSITY FOR APPLICATION OF PRINT SETTING |
| CMYK HISTOGRAM FOR APPLICATION OF PRINT SETTING |
| PRINT SETTING INFORMATION |
| CONSUMPTION RATE OF RECORDING MATERIAL (TONER CONSUMPTION RATE) |

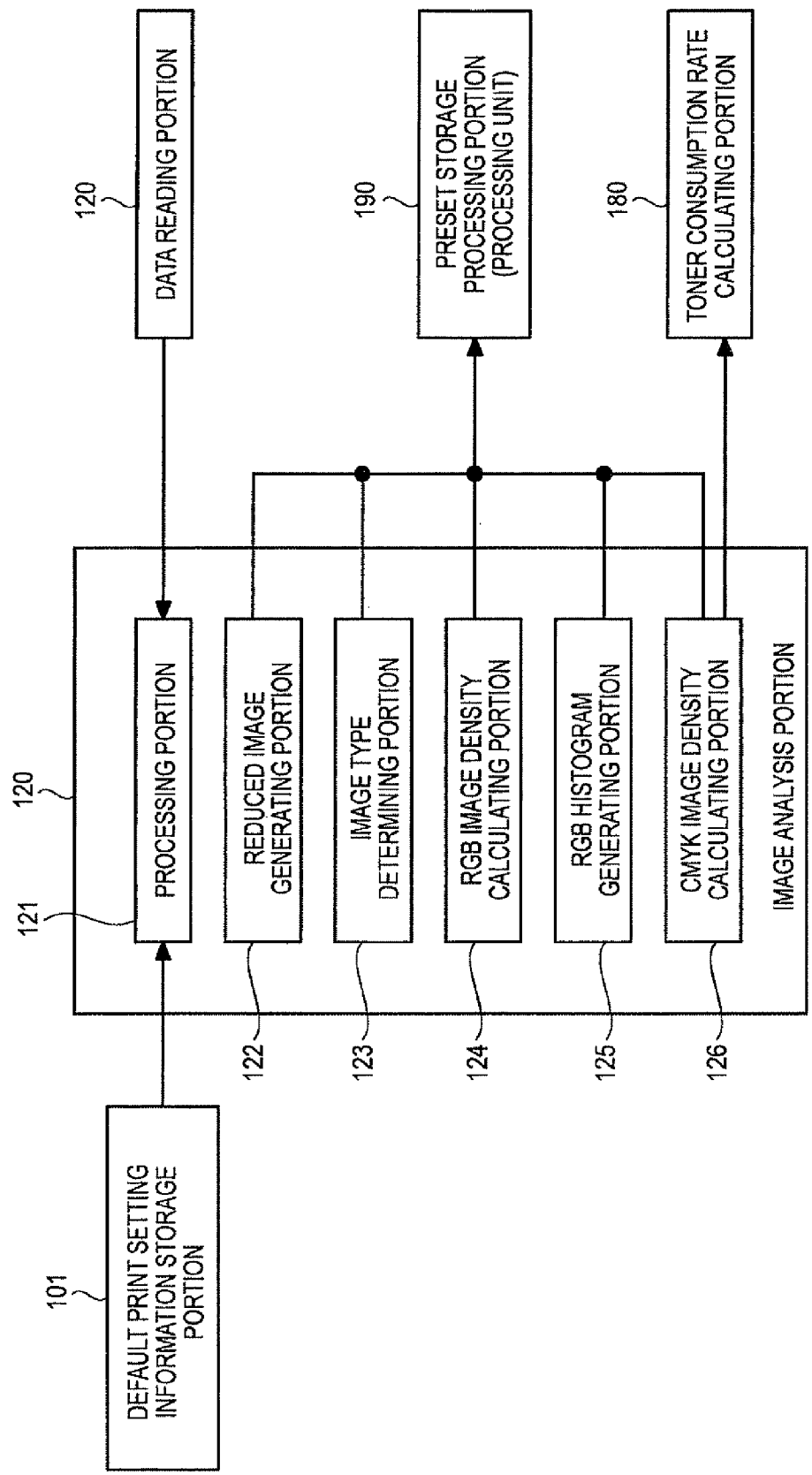

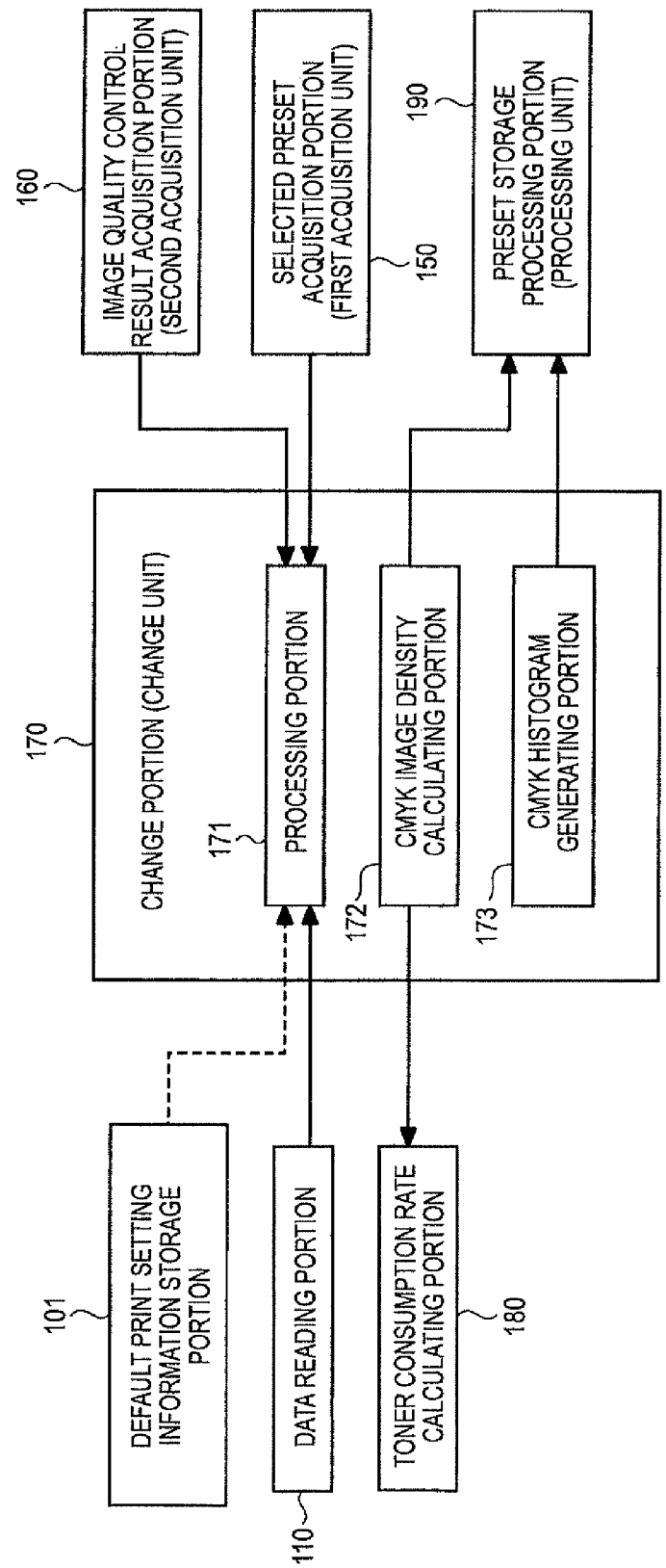

IMAGE PROCESSING APPARATUS AND COMPUTER PROGRAM PRODUCT STORING IMAGE AND PRINT SETTING INFORMATION ASSOCIATED WITH INDEX USED TO SUPPRESS TONER CONSUMPTION

CROSS-REFERENCE TO RELATED APPLICATION

This application is based on and claims priority under 35 USC 119 from Japanese Patent Application No. 2009-186114 filed on Aug. 10, 2009.

BACKGROUND

1. Technical Field

The present invention relates to an image processing apparatus and an image processing computer readable medium.

2. Related Art

Some printer drivers operating in computers have a function of suppressing consumption of a recording material (such as toner or ink) when a specific mode such as a draft mode or a toner save mode is designated in the case where the printer drivers drive a printer to print out print data.

In addition, some printers are mounted with an image quality control function for obtaining desired image quality such as brightness, saturation, etc. In such a printer, the image quality control function may be used by a user for control of values of the brightness, the saturation, etc. Depending on the result of the image quality control, consumption of the recording material may be suppressed.

SUMMARY

According to an aspect of the invention, an image processing apparatus includes a storage unit that stores image formation information in which print setting information is associated with an index useful in deciding to suppress consumption of a recording material; and an execution unit that executes a process of displaying one or more pieces of the image formation information stored in the storage unit on a display unit in association with print data to be printed.

BRIEF DESCRIPTION OF THE DRAWINGS

Embodiments of the invention will be described in detail based on the following figures, wherein:

FIG. 2 is a view showing an example of a data structure of image formation information according to the first embodiment;

FIG. 3 is a block diagram showing detailed functions of an image analysis portion of the image processing apparatus according to the first embodiment;

FIG. 4 is a block diagram showing detailed functions of a change portion of the image processing apparatus according to the first embodiment;

DETAILED DESCRIPTION

Figure 1:
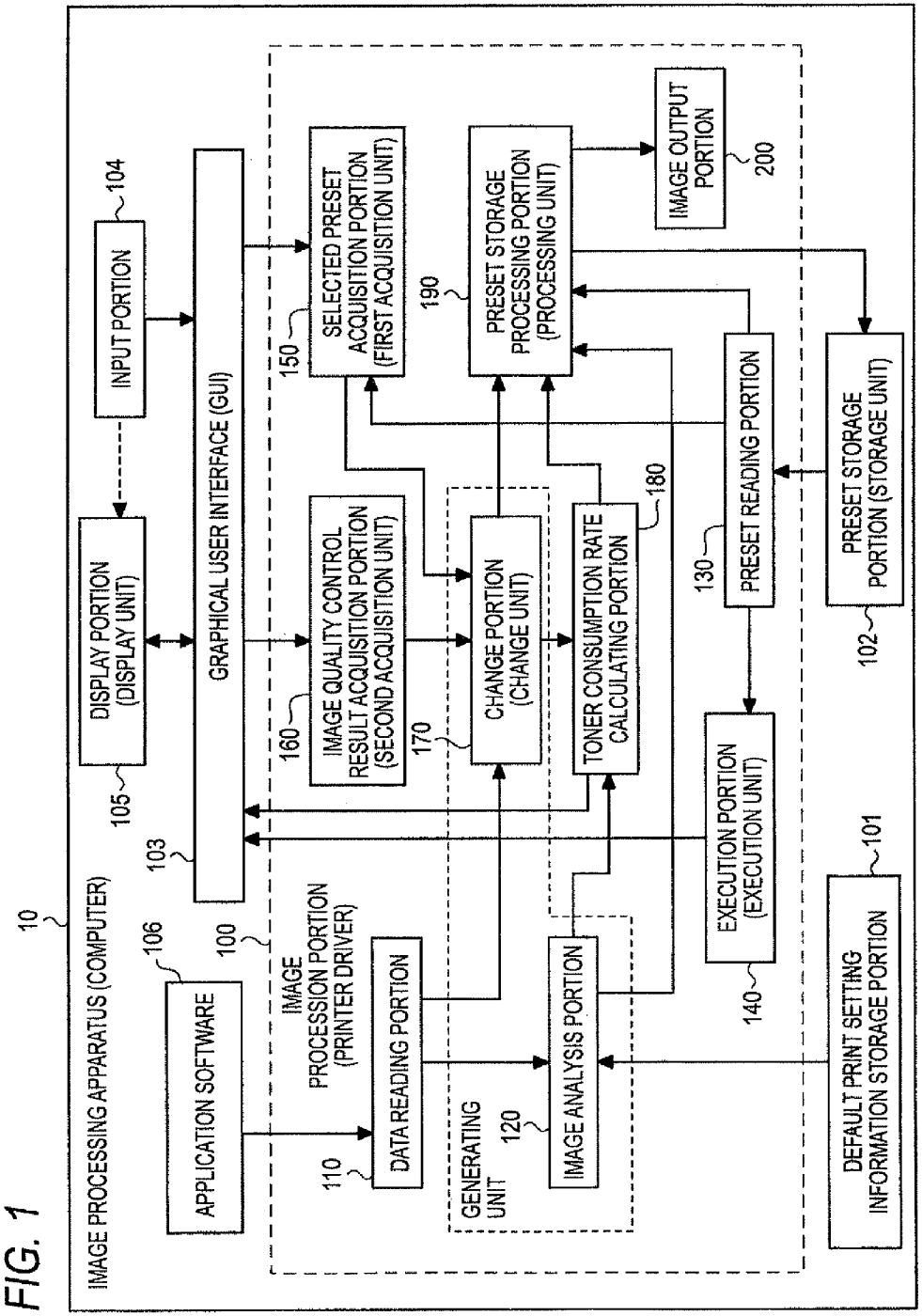
FIG. 1 is a block diagram showing functions of an image processing apparatus according to a first embodiment.

Embodiments of the invention will be described below in detail with reference to the drawings by way of example. Identical constituent elements in the drawings for describing the embodiments will be referred to by the same numerals in principal for the sake of omission of duplicated description.

(First Embodiment)

An image processing apparatus according to a first embodiment will be described.

An image processing apparatus 10 is, for example, a computer, which has an image processing portion 100, a default print setting information storage portion 101, a preset storage portion 102, a graphical user interface (hereinafter referred to as "GUI") 103, an input portion 104 and a display portion 105, as shown in FIG. 1.

The default print setting information storage portion 101 stores setting information with default settings for printing (hereinafter referred to as "default print setting information").

The preset storage portion 102 serves as a storage unit to store image formation information in which pieces of print setting information are associated with indices which are useful in deciding to suppress consumption of a recording material.

Each piece of the print setting information contains the sheet size of a paper sheet as an example of a recording medium, a color mode (monochrome or color), the number of printouts, the direction of the paper sheet, single-side/double-side printing, image quality information, etc.

The image quality information contains parameters indicating values of brightness, saturation, hue, color balance, etc.

Incidentally, when a value of at least one of setting items of the default print setting information is changed in the case where the image formation information is stored in the preset storage portion 102, the changed default print setting information becomes print setting information. When values of all the setting items of the default print setting information are not changed, the default print setting information becomes print setting information directly.

Each index useful in deciding to suppress consumption of a recording material includes information obtained by analyzing print data and information about consumption of the recording material. The print data is concerned with the print setting information contained in the image formation information.

The information obtained by analyzing print data (hereinafter referred to as "print data analysis information") contains information about the print data related to the print setting information contained in the image formation information, that is, any one of information of a reduced image where an image has been reduced, image type information indicating the type of the image, information of an image density about each color image of the image in an RGB color space (hereinafter referred to as "RGB image density"), information of a histogram about each color image of the image in the RGB color space (hereinafter referred to as "RGB histogram"), and information of an image density about each color image of the image in a CMYK color space (hereinafter referred to as "CMYK image density") in the case where the default print setting information is applied to the print data.

The information about consumption of a recording material contains any one of information of an image density (CMYK image density) about each color image of the image in the CMYK color space in the case where the print setting information is applied to the print data related to the print setting information, and information of a histogram (hereinafter referred to as "CMYK histogram") about each color image of the image in the CMYK color space in the case where the print setting information is applied to the print data related to the print setting information.

As the image type, for example, there are three, i.e. a text type, a text-and-photograph type and a photograph type. The image type information is information indicating any one of these three types. Incidentally, the text-and-photograph type means an image containing text and photographs.

The RGB color space is a color space represented by respective colors of red (R), green (G) and blue (B) (hereinafter referred to as "RBG colors").

The CMYK color space is a color space represented by respective colors of cyan (C), magenta (M), yellow (Y) and black (K) (hereinafter referred to as "CMYK colors").

The image formation information in which the aforementioned print setting information and the index useful in deciding to suppress consumption of a recording material are associated with each other means previously stored (preset) information. Therefore, the image formation information is defined as "preset" in this specification.

In the specification, the recording material is assumed to be toner. Therefore, information about consumption of the recording material is defined as toner consumption information. It is a matter of course that the recording material is not limited to toner but ink may be used as the recording material.

An example of a data structure of the image formation information (preset) is shown in FIG. 2.

As shown in FIG. 2, the image formation information, i.e. a preset, has a data structure including preset name, reduced image data, image type, RGB image density, RGB histogram, CMYK image density for application of default setting, print setting information, CMYK image density for application of print setting, CMYK histogram for application of print setting, and consumption rate of recording material.

The preset name is a name given to the preset, i.e. a name given to the preset by the system (image processing portion 100) or a user.

The CMYK image density for application of default setting means a CMYK image density about each image which has been subjected to image processing based on default print setting information.

The CMYK image density for application of print setting means a CMYK image density about each image which has been subjected to image processing based on print setting information.

The CMYK histogram for application of print setting means a CMYK histogram about each image which has been subjected to image processing based on the print setting information.

The consumption rate of the recording material means a value obtained by calculating {(CMYK image density for application of print setting/CMYK image density for application of default setting)×100}.

The reduced image (reduced image data), the image type, the RGB image density, the RGB histogram, and the print setting information have just been described above. Although the preset contains the preset name in the data structure shown in FIG. 2, the invention is however not limited thereto. For example, the preset may be configured not to contain the preset name.

Description will be made with reference to FIG. 1 again. The image processing portion 100 has a data reading portion 110, an image analysis portion 120, a preset reading portion 130, an execution portion 140, a selected preset acquisition portion 150, an image quality control result acquisition portion 160, a change portion 170, a toner consumption rate calculating portion 180, a preset storage processing portion 190, and an image output portion 200.

When a print instruction is issued from an application software 106, the data reading portion 110 reads RGB print data to be printed in accordance with the print instruction, from the application software 106.

The image analysis portion 120 analyzes the RGB print data read by the data reading portion 110, and obtains information which is generated from the analysis of the print data. Detailed functions of the image analysis portion 120 will be described later.

The preset reading portion 130 reads one or more presets (all presets) stored in the preset storage portion 102.

The execution portion 140 serves as an execution unit to execute a process of displaying pieces of preset information corresponding to all the presets (the one or more presets stored in the preset storage portion 102) read by the preset reading portion 130 on the display unit 105 through the GUI 103 and in association with the print data to be printed. In this case, all the pieces of preset information displayed on the display portion 105 are preset candidates associated with the print data to be printed.

The selected preset acquisition portion 150 serves as a first acquisition unit to acquire a specific piece of preset information which is selected based on user's operation on the input portion 104 from the pieces of preset information corresponding to the one or more presets displayed on the display portion 105 through the GUI 103.

In addition, the selected preset acquisition portion 150 acquires a specific preset corresponding to the acquired specific piece of preset information from all the presets read by the preset reading portion 130. The specific preset acquired by the selected preset acquisition portion 150 is supplied to the change portion 170.

The image quality control result acquisition portion 160 serves as a second acquisition unit to acquire an image quality control result in accordance with user's image quality control on the print data through the GUI 103. The image quality control is performed by changing a desired one of setting values of print setting property (in an image quality control screen) displayed on the display portion 105 based on user's operation on the input portion 104. The image quality control result acquired by the image quality control result acquisition portion 160 is supplied to the change portion 170.

The change portion 170 serves as a change unit to change the specific preset from the selected preset acquisition portion 150 (the specific preset acquired by the selected preset acquisition portion 150), based on the image quality control result from the image quality control result acquisition portion 160 (the image quality control result acquired by the image quality control result acquisition portion 160). Detailed functions of the change portion 170 will be described later.

The toner consumption rate calculating portion 180 calculates a consumption rate of toner (hereinafter referred to as "toner consumption rate") concerned with the print data by an arithmetic operation of the following expression.

Toner Consumption Rate (%)={(CMYK Image Density For Application of Print Setting/CMYK Image Density For Application of Default Setting)×100}

The preset storage processing portion 190 serves as a processing unit to execute a process of storing the specific preset in the preset storage portion 102 correspondingly to the print data when the specific preset changed by the change portion 170 satisfies predetermined storage conditions.

In addition, the preset storage processing portion 190 outputs print setting information in the specific preset and the print data to be printed correspondingly to the print setting information to the image output portion 200.

The image output portion 200 outputs, as a print job, the print data and the print setting information from the preset storage processing portion 190 to a not-shown printer and makes a print request to the printer.

A detailed functional configuration of the image analysis portion 120 will be described below with reference to FIG. 3.

As shown in FIG. 3, the image analysis portion 120 has a processing portion 121, a reduced image generating portion 122, an image type determining portion 123, an RGB image density calculating portion 124, an RGB histogram generating portion 125, and a CMYK image density calculating portion 126.

The processing portion 121 performs predetermined processing based on initial print setting information (i.e. default print setting information) and RGB print data to be printed. In addition, the processing portion 121 performs predetermined processing based on print setting information when image quality control has been performed (changed default print setting information, i.e. print setting information, when values of the default print setting information have been changed) and the RGB print data.

That is, the processing portion 121 performs the following processes (1) to (4) based on initial print setting information and RGB print data to be printed.

(1) The processing portion 121 reads default print setting information from the default print setting information storage portion 101 and executes image processing on RGB print data to be printed read by the data reading portion 110, based on image quality information (values of setting items concerned with image quality) in the read default print setting information. By the image processing, the image quality information (the values of the setting items concerned with image quality) is reflected in the RGB print data. This RGB print data is supplied to the RBG histogram generating portion 125.

(2) The processing portion 121 generates output plane information (bit mask) of each color R, G, B based on the RBG print data which is the result of the aforementioned process (1) (image processing). The output plane information of each color R, B is supplied to the RGB image density calculating portion 124.

(3) The processing portion 121 executes a color conversion process on the RBG print data which is the result of the aforementioned process (1) (image processing) so as to color-convert the print data from an RGB color space to a CMYK color space based on a multi-dimensional (three-dimensional etc.) lookup table (LUT) for use in color space conversion. In addition, the processing portion 121 performs a tone correction process on the color-converted print data in the CMYK color space so as to correct the tone of the print data based on a tone reproduction curve (TRC). This process results in CMYK print data.

(4) The processing portion 121 generates output plane information (bit mask) of each color C, M, Y, K based on each image which has been subjected to image processing based on the default print setting information, i.e. the print data (CMYK print data) which has been subjected to the aforementioned process (3). This output plane information of each color C, M, Y, K is supplied to the CMYK image density calculating portion 126.

The reduced image generating portion 122 generates a reduced image based on the RGB print data to be printed. In the reduced image, the image based on the print data is reduced to a predetermined image size.

The image type determining portion 123 calculates a ratio of graphics (broadly-defined graphics) to the image in the RGB print data based on the RGB print data to be printed, and determines a type of the image based on the calculated result (a ratio of an area where the broadly-defined graphics should be printed to an area where the image should be printed). In the specification, the graphics (broadly-defined graphics) is assumed to contain at least one element of narrowly-defined graphics (such as drawings) and text.

Specifically, the image type determining portion 123 determines the image type as follows. That is, if "the area where the broadly-defined graphics should be printed>the area where the image should be printed", the image type will be determined as "text". If "the area where the broadly-defined graphics should be printed=the area where the image should be printed", the image type will be determined as "text-and-photograph". If "the area where the broadly-defined graphics should be printed<the area where the image should be printed", the image type will be determined as "photograph".

In the relation of "the area where the broadly-defined graphics should be printed>the area where the image should be printed", the image type will be determined as "text" when the broadly-defined graphics has the contents including text and narrowly-defined graphics, the contents including only narrowly-defined graphics or the contents including only text.

The ROB image density calculating portion 124 calculates RGB image densities based on the output plane information of each color R, G B from the processing portion 121.

Incidentally, assume that an image (RGB image) A is represented by the colors R, G and B in an RGB color space. In this case, when an image density of the image A with respect to the color R is expressed as Ra, an image density of the image A with respect to the color G is expressed as Ga and an image density of the image A with respect to the color B is expressed as Ba, the RGB image density calculating portion 124 calculates the R, G and B image densities based on an arithmetic operation of the following Expression 1. The image size of the RGB image A is expressed horizontally and vertically as width and height respectively.

$$Ra = \sum_{x=0}^{width-1} \sum_{y=0}^{height-1} P_R(x, y)$$

$$Ga = \sum_{x=0}^{width-1} \sum_{y=0}^{height-1} P_G(x, y)$$

$$Ba = \sum_{x=0}^{width-1} \sum_{y=0}^{height-1} P_B(x, y)$$

[Expression 1]

Here, $P_R(x,y)$ indicates a value of the color R of a pixel in coordinates (x,y) of the image A. $P_G(x,y)$ indicates a value of the color G of the pixel in the coordinates (x,y) of the image A. $P_B(x,y)$ indicates a value of the color B of the pixel in coordinates (x,y) of the image A.

The RGB histogram generating portion 125 generates RGB histograms based on RGB print data from the processing portion 121.

The CMYK image density calculating portion 126 calculates C, M, Y and K image densities for application of default setting based on the output plane information of each color C, M, Y, K from the processing portion 121.

Incidentally, assume an image (CMYK image) A is represented by the colors C, M, Y and K in a CMYK color space. In this case, when an image density of the image A with respect to the color C is expressed as Ca, an image density of the image A with respect to the color M is expressed as Ma, an image density of the image A with respect to the color Y is expressed as Ya and an image density of the image A with respect to the color K is expressed as Ka, the CYMK image density calculating portion 126 calculates C, M, Y and K image densities based on an arithmetic operation of the following Expression 2. The image size of the CMYK image A is expressed horizontally and vertically as width and height respectively.

$$Ca = \sum_{x=0}^{width-1} \sum_{y=0}^{height-1} P_C(x, y)$$

$$Ma = \sum_{x=0}^{width-1} \sum_{y=0}^{height-1} P_M(x, y)$$

$$Ya = \sum_{x=0}^{width-1} \sum_{y=0}^{height-1} P_Y(x, y)$$

$$Ka = \sum_{x=0}^{width-1} \sum_{y=0}^{height-1} P_K(x, y)$$

[Expression 2]

Here, $P_C(x,y)$ indicates a value of the color C of a pixel in coordinates (x,y) of the image A. $P_M(x,y)$ indicates a value of the color M of the pixel in the coordinates (x,y) of the image A. $P_Y(x,y)$ indicates a value of the color Y of the pixel in the coordinates (x,y) of the image A. $P_K(x,y)$ indicates a value of the color K of the pixel in the coordinates (x,y) of the image A.

The reduced image generated by the reduced image generating portion 122, the image type determined by the image type determining portion 123, the R, G, and B image densities calculated by the RGB image density calculating portion 124, the R, G and B histograms created by the RGB histogram generating portion 125, and the C, M, Y and K image densities for application of default setting calculated by the CMYK image density calculating portion 126 are supplied to the preset storage processing portion 190, respectively.

The C, M, Y and K image densities for application of default setting are also supplied to the toner consumption rate calculating portion 180.

A detailed functional configuration of the change portion 170 will be described below with reference to FIG. 4.

As shown in FIG. 4, the change portion 170 has a processing portion 171, a CMYK image density calculating portion 172 and a CMYK histogram generating portion 173.

The processing portion 171 performs the following processes (5) to (7) based on print setting information when image quality control (control of image quality such as brightness, saturation, hue, etc.) has been performed on the RGB print data to be printed read by the data reading portion 110, and the RGB print data.

(5) The processing portion 171 changes image quality information (values of setting items concerned with the image quality) in print setting information contained in a specific preset from the selected preset acquisition portion 150, based on a result of the image quality control from the image quality control result acquisition portion 160. In addition, the processing portion 171 executes image processing on the RGB print data which has been subjected to the image quality control, based on the changed image quality information (the values of the setting items concerned with the image quality) in the print setting information. By the image processing, the result of the image quality control is reflected in the RGB print data.

Incidentally, upon acquisition of the result of the image quality control from the image quality control result acquisition portion 160 in the state in which no preset is selected by the user (in the state in which a specific preset is not acquired from the selected preset acquisition portion 150), the processing portion 171 performs the following process.

That is, the processing portion 171 reads default print setting information from the default print setting information storage portion 101 and changes image quality information (values of the setting items concerned with the image quality) in the read default print setting information based on the acquired result of the image quality control. In addition, the processing portion 171 executes image processing on the RGB print data which has been subjected to the image quality control, based on the changed image quality information (the values of the setting items concerned with the image quality) in the default print setting information. By the image processing, the result of the image quality control is reflected in the RGB print data.

(6) The processing portion 171 executes a color conversion process on the RGB print data which is the result of the aforementioned process (5) (image processing) so as to color-convert the print data from an RGB color space to a CMYK color space, in the same manner as in the aforementioned process (3) performed by the processing portion 121. In addition, the processing portion 171 executes a tone correction process on the color-converted print data in the CMYK color space so as to correct the tone of the print data based on a tone reproduction curve (TRC). This process results in CMYK print data, which is supplied to the CMYK histogram generating portion 173.

(7) The processing portion 171 generates output plane information (bit mask) of each color C, M, Y, K based on the image which has been subjected to the image processing based on the changed print setting information, i.e. the print data (CMYK print data) which has been subjected to the aforementioned process (6). The output plane information of each color C, M, Y, K is supplied to the CMYK image density calculating portion 172.

The CMYK image density calculating portion 172 calculates C, M, Y and K image densities for application of print setting, where relevant print setting information (also including the changed print setting information) is applied to the CMYK print data to be printed. Specifically, the CMYK image density calculating portion 172 calculates C, M, Y and K image densities for application of print setting based on the output plane information of each color C, M, Y, K outputted from the processing portion 171. In this case, the CMYK image density calculating portion 172 calculates the C, M, Y and K image densities for application of print setting, based on an arithmetic operation of the aforementioned Expression 2. The thus calculated C, M, Y and K image densities for application of print setting are supplied to the toner consumption rate calculating portion 180 and the preset storage processing portion 190.

The CMYK histogram generating portion 173 generates C, M, Y and K histograms for application of print setting, where relevant print setting information (also including the changed print setting information) is applied to the CMYK print data to be printed. Specifically, the CMYK histogram generating portion 173 creates C, M, Y and K histograms based on the CMYK print data outputted from the processing portion 171. The thus created C, M, Y and K histograms for application of print setting are supplied to the preset storage processing portion 190.

The GUI 103 serves as a graphical user interface (GUI) to output display information such as print dialog (property) provided by the application software 106 or print setting property provided by the image processing portion 100 to the display portion 105, and output input information inputted to the print dialog or the print setting property to the image processing portion 100.

The input portion 104 is, for example, an input device which inputs input information into the print dialog or the print setting property displayed on the display portion 105. The input information may include an instruction to perform print setting, an instruction to print, selection from choices, etc.

The display portion 105 is, for example, a display device, which displays display information such as print dialog or print setting property from the GUI 103.

In the first embodiment, the image analysis portion 120 and the change portion 170 cooperate with each other to serve as a generating unit so as to generate the print setting information and the aforementioned index related to the print data to be printed, based on the result of the image quality control acquired by the image quality control result acquisition portion 160 serving as an acquisition unit.

In the first embodiment, the image processing portion 100 is assumed to be a printer driver. The image processing portion 100 is not limited to the printer driver but may be formed as exclusive software, firmware or hardware.

A print setting process of the image processing apparatus 10 will be described below with reference to FIG. 5.

When a print instruction is issued from the application software 106 which is in operation in the image processing apparatus 10, the data reading portion 110 in the image processing portion 100 as a printer driver reads RBG print data to be printed in accordance with the print instruction, from the application software 106 (step S101), and outputs the read RGB print data to the image analysis portion 120.

Upon reception of the RGB print data from the data reading portion 110, the image analysis portion 120 analyzes the print data and obtains print data analysis information based on the analyzed result (step S102).

That is, a reduced image generating process performed by the reduced image generating portion 122, an image type determining process performed by the image type determining portion 123, an RGB image density calculating process performed by the RGB image density calculating portion 124, an RGB histogram generating process performed by the RGB histogram generating portion 125 and a CMYK image density calculating process performed by the CMYK image density calculating portion 126 are performed respectively in the image analysis portion 120.

A reduced image generated by the reduced image generating portion 122, an image type determined by the image type determining portion 123, R, G and B image densities calculated by the RBG image density calculating portion 124, R, G and B histograms generated by the RGB histogram generating portion 125, and C, M, Y and K image densities for application of default setting calculated by the CMYK image density calculating portion 126 are supplied to the preset storage processing portion 190 respectively.

When analysis of the print data is completed, the preset reading portion 130 reads one or more presets (all presets) from the preset storage portion 102.

Then, the execution portion 140 displays print setting property (print setting screen) including display of pieces of preset information respectively corresponding to all the read presets, on the display portion 105 through the GUI 103 (step S103).

Figure 6:
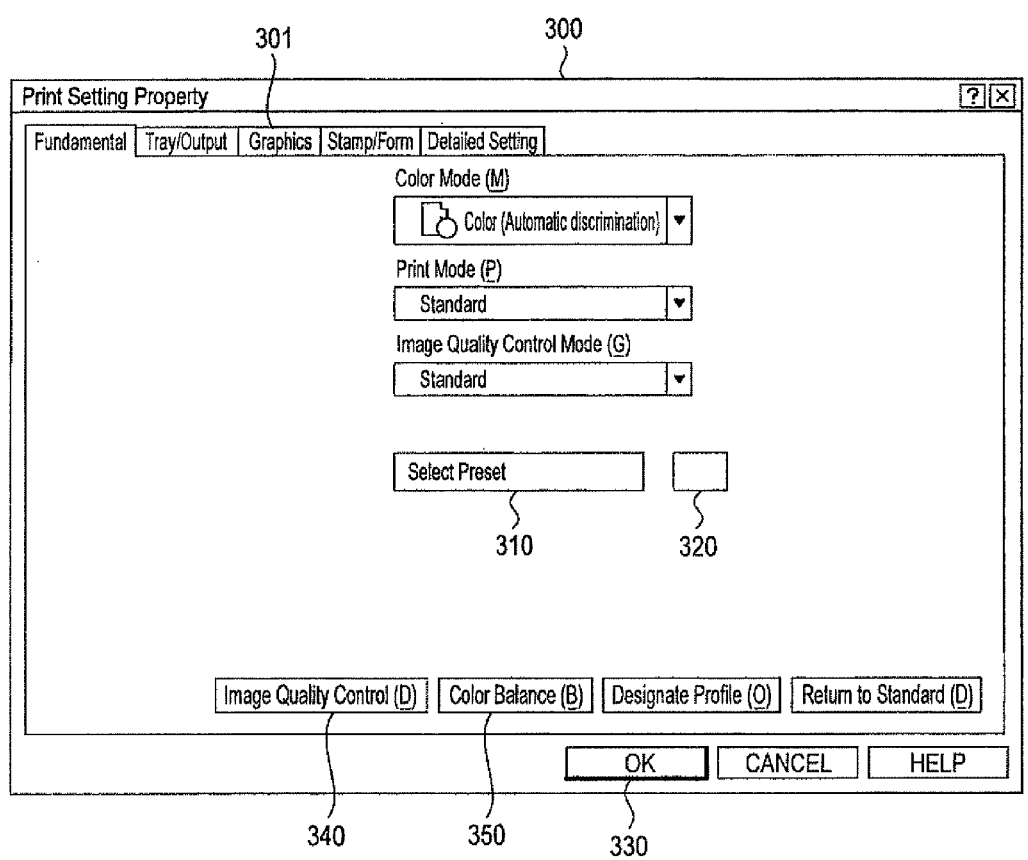
FIG. 6 is a view showing an example of print setting property provided by an image processing portion of the image processing apparatus according to the first embodiment.

Here, an example of the print setting property is shown in FIG. 6. A print setting property 300 shown in FIG. 6 indicates an image quality control screen (a screen for changing image quality information) when an item (tab) "graphics" 301 has been selected.

When the user wants to use (reuse) a preset, the user operates the input portion 104 to select a setting section 320 corresponding to an item "select the preset" 310 (check the setting section 320) and then pushes down an "OK" button 330.

Incidentally, when the user does not want to use (reuse) a preset, the user selects an item "image quality control" 340 or an item "color balance" 350 for changing values of image quality information in the default print setting information.

When the setting section 320 is selected (the setting section 320 is checked) and the "OK" button 330 is pushed down, the contents of the print setting property 300 are supplied to the image processing portion 100 through the GUI 103. Therefore, in the image processing portion 100, the execution portion 140 displays a preset selection screen on the display portion 105 through the GUI 103. The preset selection screen is provided for selecting (reusing) a specific preset from all the presets read by the preset reading portion 130 and making print setting.

Figure 7:
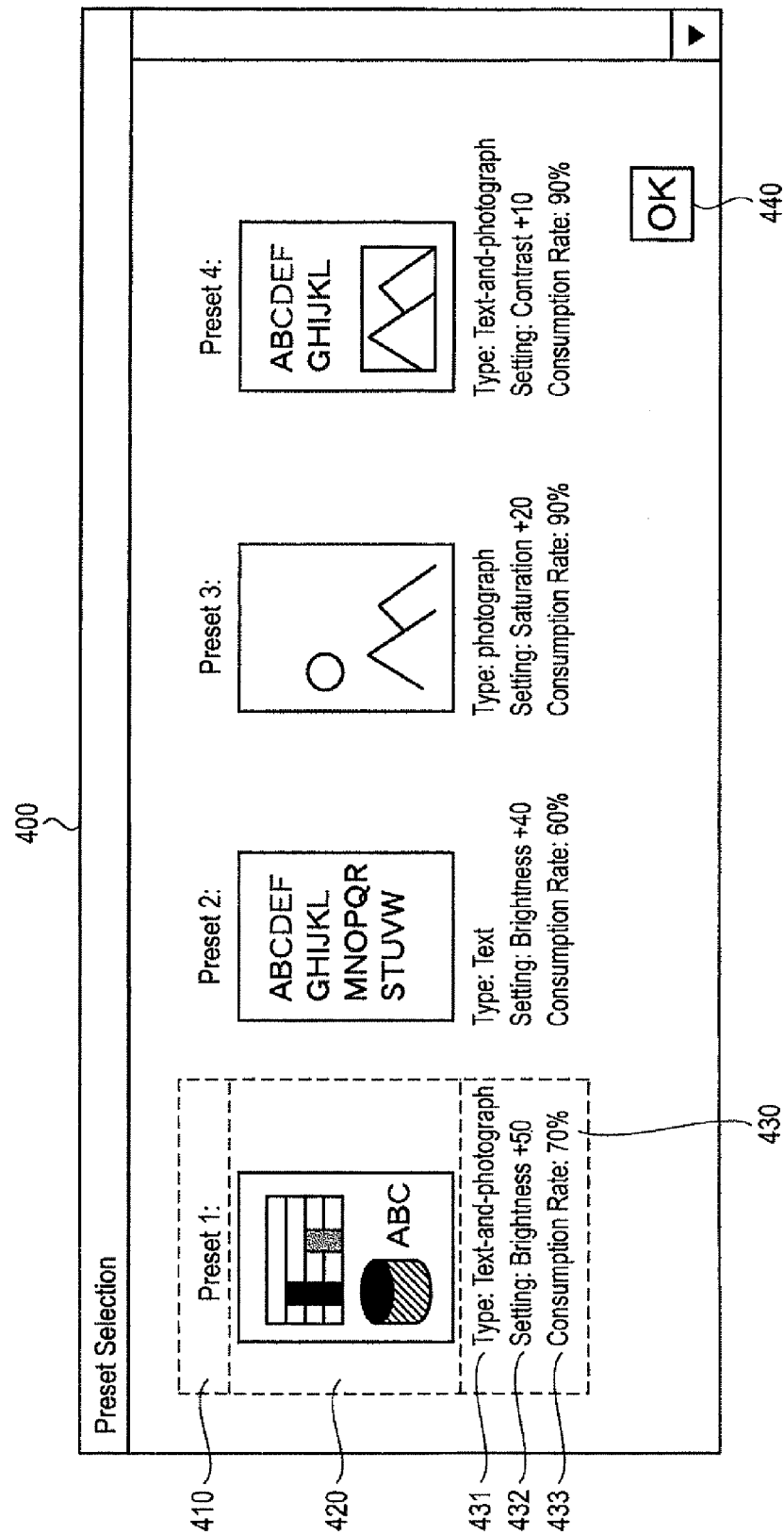
FIG. 7 is a view showing an example of a preset selection screen provided by the image processing portion of the image processing apparatus according to the first embodiment.

Here, an example of the preset selection screen is shown in FIG. 7.

In a preset selection screen 400 shown in FIG. 7, pieces of preset information in each of which a preset name, a reduced image and image information are associated with one another are displayed in a list.

For example, the preset information corresponding to the preset name=preset 1 includes a preset name 411 (preset name=preset 1), a reduced image 420 and image information 430.

The image information 430 is constituted by items of an image type 431, a setting 432, and a tonner consumption rate 433. In this example, the image information 430 is constituted by image type="text-and-photograph", setting="brightness+50" and toner consumption rate="70%".

The item of the setting 432 indicates a setting item on which the image quality has been controlled and an image quality control quantity. The setting item is selected from setting items concerned with image quality such as brightness, saturation, contrast, hue, etc. In this example, the control value (setting="brightness+50") in the item of the setting 432 indicates that an image quality quantity (brightness control quantity in this example) from a reference value "0" (default setting value "0") in terms of the value of the setting item of brightness is "+50".

The item of the toner consumption rate 433 is a toner consumption rate in the preset. That is, the value of the item of the toner consumption rate 433 indicates a toner consumption rate when setting items concerned with image quality are set so that the value of brightness is "brightness+50" and values corresponding to the setting items of saturation, contrast, hue, etc. are default setting values.

The reduced image 420 indicates a reduced image generated based on the image quality information when the setting items concerned with the image quality are set so that the value of brightness is "brightness+50" and values corresponding to setting items of saturation, contrast, hue, etc. are default setting values.

Incidentally, pieces of preset information corresponding to preset name=preset 2, preset name=preset 3, and preset name=preset 4 have the same data structure as the preset information corresponding to preset name=preset 1.

The user operates the input portion 104, for example, to select a preset name or a reduced image of preset information having a desired reduced image or a desired toner consumption rate from the plurality of pieces of preset information listed on the preset selection screen 400 displayed on the display portion 105, and then pushes down an "OK" button 440.

When the "OK" button 440 is pushed down thus, the thus selected desired preset information is supplied to the selected preset acquisition portion 150 of the image processing portion 100 through the GUI 103.

Description will be made with reference to FIG. 5 again. In the image processing portion 100 which has completed the step S103, the selected preset acquisition portion 150 determines whether the preset should be read or not in accordance with whether the desired preset information selected from the one or more pieces of preset information displayed on the preset selection screen 400 has been acquired or not (step S104).

When the selected preset acquisition portion 150 acquires the desired preset information through the GUI 103 and determines that the preset should be read in the step S104, the selected preset acquisition portion 150 reads a preset corresponding to the desired preset information from all the presets read by the preset reading portion 130 (step S105) and outputs the read preset to the change portion 170.

In addition, the selected preset acquisition portion 150 displays an image quality control screen (print setting property) for controlling image quality of an image corresponding to the acquired preset, on the display portion 105 through the GUI 103.

When, for example, the preset information for preset name=preset 1 is selected from the plurality of pieces of preset information displayed on the preset selection screen 400, a preset corresponding to the preset information for preset name=preset 1 is read from all the presets read by the preset reading portion 130 and supplied to the change portion 170 by the selected preset acquisition portion 150.

Figure 8:
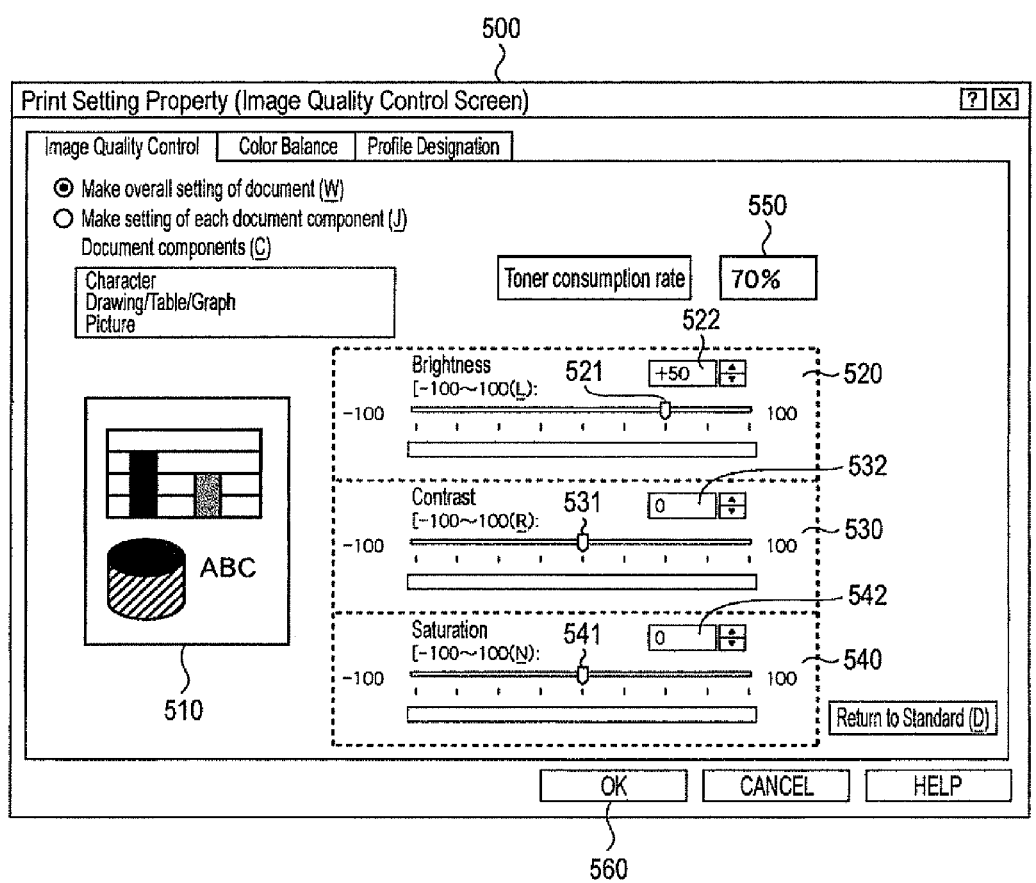
FIG. 8 is a view showing an example of the print setting property as an image quality control screen provided by the image processing portion of the image processing apparatus according to the first embodiment.

As an image quality control screen for controlling the image quality of an image related to the preset corresponding to the preset information for preset name=preset 1, a print setting property 500 shown in FIG. 8 is displayed on the display portion 105.

In the print setting property (image quality control screen) 500 shown in FIG. 8, the reference numeral 510 designates a reduced image obtained by reducing an input image related to the preset; 520, a brightness control item for controlling brightness; 530, a contrast control item for controlling contrast; 540, a saturation control item for controlling saturation; and 550, a toner consumption rate display section.

The user may move a slider bar 521 of the brightness control item 520 rightward (in a +100 direction) or leftward (in a −100 direction) to control the value of brightness. The controlled value of brightness is displayed on a brightness value display section 522. Incidentally, the control range of brightness is between "−100" and "+100", both inclusively. When the print setting property 500 is displayed, the slider bar 521 is located at a place indicating the value of brightness as "+50" (a portion equivalent to +50) based on the control value (setting="brightness +50") of the item of the setting 432 contained in the preset information for preset name=preset 1.

In addition, the user may move a slider bar 531 of the contrast control item 530 rightward (in a +100 direction) or leftward (in a −100 direction) to control the value of contrast. The controlled value of contrast is displayed on a contrast value display section 532. Incidentally, the control range of contrast is between "−100" and "+100", both inclusively. When the print setting property 500 is displayed, the slider bar 531 is located at the center of the control range of contrast (a portion equivalent to a value 0) correspondingly to an initial setting value of contrast.

Further, the user may move a slider bar 541 of the saturation control item 540 rightward (in a +100 direction) or leftward (in a −100 direction) to control the value of saturation. The controlled value of saturation is displayed on a saturation value display section 542. Incidentally, the control range of saturation is between "−100" and "+100", both inclusively. When the print setting property 500 is displayed, the slider bar 541 is located at the center of the control range of saturation (a portion equivalent to a value 0) correspondingly to an initial setting value of saturation.

When the print setting property 500 is displayed, a value "70%" of the toner consumption rate in the case where the value of brightness is "+50", the value of contrast is "0" and the value of saturation is "0" is displayed in the toner consumption rate display section 550.

The value of the toner consumption rate changed in accordance with the result of the image quality control is displayed in the toner consumption rate display section 550.

When image quality control is performed on at least one of the brightness control item 520, the contrast control item 530 and the saturation control item 540 in the print setting property 500 based on a user's operation on the input portion 104, the value of the control item which has been subjected to the image quality control is supplied to the image quality control result acquisition portion 160 of the image processing portion 100 through the GUI 103.

The image quality control result acquisition portion 160 acquires a result of the image quality control (a controlled result of the image quality information in the print setting information) from the GUI 103 (step S106) and outputs the result of the image quality control to the change portion 170.

The change portion 170 changes the specific preset from the selected preset acquisition portion 150 based on the result of the image quality control from the image quality control result acquisition portion 160.

For example, in the change portion 170, the processing portion 171 changes the image quality information (the values of the setting items concerned with image quality) in the print setting information contained in the specific preset from the selected preset acquisition portion 150 based on the result of the image quality control from the image quality control result acquisition portion 160. The changed print setting information having the changed values of the setting items concerned with the image quality is supplied to the preset storage processing portion 190.

In addition, in the change portion 170, the CMYK image density calculating portion 172 performs an arithmetic operation of the aforementioned Expression 2 to calculate C, M, Y and K image densities for application of print setting, where the relevant changed print setting information is applied to CMYK print data to be printed (step S107).

The thus calculated C, M, Y and K image densities for application of print setting are supplied to the toner consumption rate calculating portion 180 and the preset storage processing portion 190.

The toner consumption rate calculating portion 180 calculates a toner consumption rate based on the C, M, Y and K image densities for application of print setting from the CMYK image density calculating portion 172 of the change portion 170 and the C, M, Y and K image densities for application of default setting from the CMYK image density calculating portion 126, and displays the calculated toner consumption rate on the display portion 105 through the GUI 103 (step S108).

The toner consumption rate calculated as described above is supplied to the preset storage processing portion 190.

The value of the toner consumption rate from the toner consumption rate calculating portion 180 is displayed in the toner consumption rate display section 550 of the print setting property 500 displayed on the display portion 105.

When image quality control is performed, print data changes in accordance with a result of the image quality control so that a toner consumption rate (toner consumption) also changes accordingly. Therefore, in the first embodiment, when image quality control is performed, C, M, Y and K image densities for application of print setting are calculated based on a result of the image quality control every time when the state after the image quality control (the result of the image quality control) continues for a predetermined time. A toner consumption rate is calculated based on the C, M, Y and K image densities for application of print setting and C, M, Y and K image densities for application of default setting. Further, the toner consumption rate is displayed.

When the user determines that the toner consumption rate or image quality is the desired one by referring to the value of the toner consumption rate displayed in the toner consumption rate display section 550 and the values of the respective control items of the brightness control item 520, the contrast control item 530 and the saturation control item 540, the user operates the input portion 104 to push down an "OK" button 560 of the print setting property 500. A message indicating that the "OK" button 560 has been pushed down is supplied to the image quality control result acquisition portion 160 through the GUI 103 and further supplied to the change portion 170 from the image quality control result acquisition portion 160.

The change portion 170 which has executed the toner consumption rate display process in the step S108 determines whether the image quality control has been completed or not in accordance with whether the message indicating that the "OK" button 560 has been pushed down has been acquired from the image quality control result acquisition portion 160 or not (step S109).

When the change portion 170 determines that the image quality control has not been completed yet in the step S109 because the message indicating that the "OK" button 560 has been pushed down has not been acquired, the procedure of processing goes to the step S106.

On the contrary, when the change portion 170 determines that the image quality control has been completed in the step S109 because the message indicating that the "OK" button 560 has been pushed down has been acquired, the CMYK histogram generating portion 173 in the change portion 170 generates C, M, Y and K histograms for application of print setting, where the relevant changed print setting information is applied to the CMYK print data to be printed (step S110). The thus generated C, M, Y and K histograms for application of print setting are supplied to the preset storage processing portion 190.

The preset storage processing portion 190 has acquired the print data analysis information (the reduced image, the image type, the R, G and B image densities, the R, G and B histograms, and the C, M, Y and K image densities for application of default setting), the print setting information (the changed print setting information), the toner consumption information (the C, M, Y and K image densities for application of print setting and the C, M, Y and K histograms for application of print setting) and the toner consumption rate. Thus, the print data analysis information, the print setting information, the toner consumption information and the toner consumption rate are set as one preset to be stored.

Then, the preset storage processing portion 190 determines whether the one preset to be stored should be stored or not in accordance with whether the one preset satisfies predetermined storage conditions or not (step S111).

Here, assume that the preset to be stored is compared with a preset to be compared, for example, each of all the presets stored in the preset storage portion 102. In this case, the predetermined storage conditions may include (a) image types of the two presets are not consistent with each other; (b) a differential value between setting values of print setting information of the two presets exceeds a predetermined first value (threshold); (c) a differential value between R, G and B histograms of the two presets exceeds a predetermined second value (threshold); etc.

When the preset storage processing portion 190 determines that the preset should be stored in the step S111 because the preset satisfies the aforementioned storage conditions, the preset storage processing portion 190 stores the one preset (the print data analysis information, the print setting information, the toner consumption information and the toner consumption rate) in the preset storage portion 102 (step S112).

When the one preset is stored in the preset storage portion 102, the preset storage processing portion 190 may generate a preset name corresponding to the one preset, for example, following predetermined rules, and store the one preset including the generated preset name in the preset storage portion 102.

When the preset storage processing portion 190 determines that the preset should not be stored in the step S111 because the preset does not satisfy the storage conditions or when the preset storage processing portion 190 has completed the step S112, the preset storage processing portion 190 outputs the acquired print setting information and the print data to be printed corresponding to the print setting information to the image output portion 200.

The image output portion 200 outputs, as a print job, the print data and the print setting information from the preset storage processing portion 190 to a not-shown printer and makes a print request to the printer (step S113).

Figure 9:
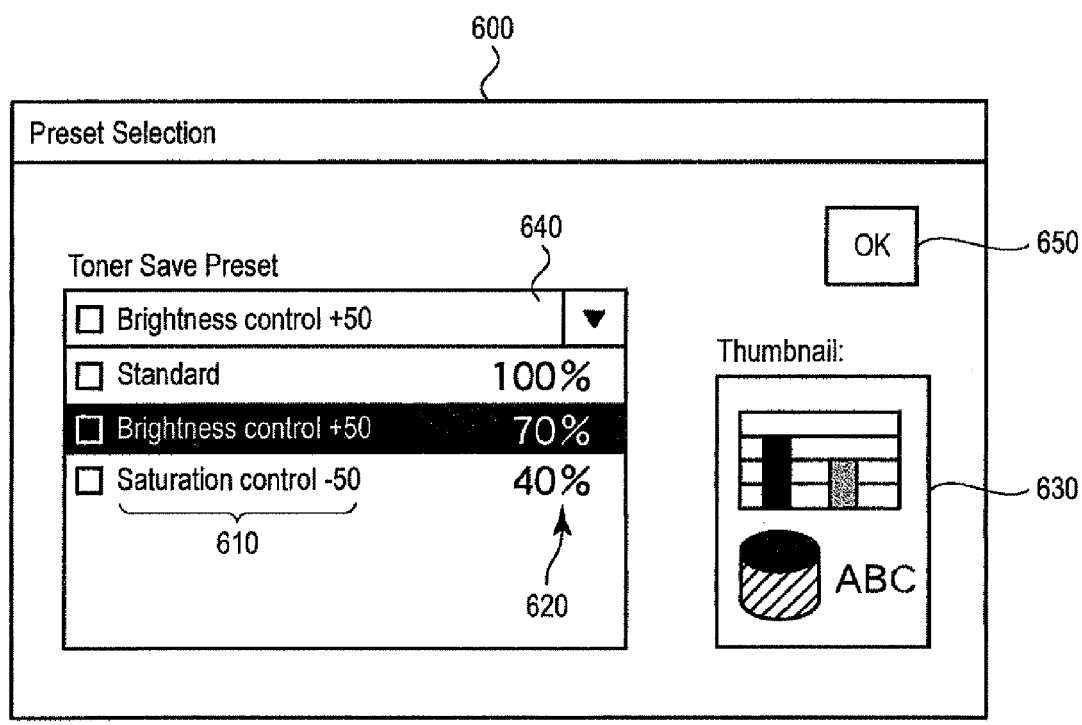
FIG. 9 is a view showing another example of the preset selection screen provided by the image processing portion of the image processing apparatus according to the first embodiment.

In the first embodiment, the preset selection screen is not limited to the preset selection form of the preset selection screen 400 shown in FIG. 7 but may be set in a preset selection form of a preset selection screen 600 shown in FIG. 9.

In the preset selection screen 600 shown in FIG. 9, a list of preset information in which an item of a preset name 610 and an item of a toner consumption rate 620 correspond to each other is displayed in the form of a dropdown menu and a reduced image (thumbnail) 630 of an image quality based on image quality information (brightness, saturation, hue, etc.) contained in print setting information in a preset corresponding to preset information (the preset name and the toner consumption rate) selected from the list of the preset information is displayed.

In this example, preset name="standard" corresponds to toner consumption rate="100%", preset name="brightness control-F-50" corresponds to toner consumption rate="70%", and preset name="saturation control−50" corresponds to toner consumption rate="40%". In addition, the reduced image (thumbnail) 630 has an image quality based on the image quality information (brightness, saturation, hue, etc.) contained in the print setting information in the preset when preset name="brightness control+50" is selected.

Incidentally, when preset name="standard" or preset name="saturation control-50" is selected, a reduced image with an image quality based on the image quality information (brightness, saturation, hue, etc.) contained in the print setting information in the preset corresponding to the selected preset name is displayed.

The user operates the input portion 104 to select desired preset information from the preset information displayed in the form of a dropdown menu on the preset selection screen 600 displayed on the display portion 105.

Then, the desired preset information (the preset name and the toner consumption rate) is displayed in a preset selection section 640 of the preset selection screen 600 while a reduced image corresponding to the desired preset information is displayed on the preset selection screen 600. When the user checks the displayed reduced image and concludes that the reduced image has an intended image quality, the user operates the input portion 104 to push down an "OK" button 650.

When the "OK" button 650 has been pushed down in this manner, the selected desired preset information is supplied to the selected preset acquisition portion 150 of the image processing portion 100 through the GUI 103. The processing following this step is the same as the aforementioned processing.

Although the specification has been described in the case where a calculated consumption rate of a recording material (a toner consumption rate) is stored as part of a preset in the preset storage portion 102, the invention is not limited thereto. For example, a consumption rate of a recording material related to print data corresponding to each of all presets stored in the preset storage portion 102 may be calculated based on C, M, Y and K image densities for application of default setting and C, M, Y and K image densities for application of print setting.

That is, when a toner consumption rate corresponding to each of all the presets is calculated, the toner consumption rate calculating portion 180 calculates the toner consumption rate correspondingly to each of all the presets and based on C, M, Y and K image densities for application of default setting and C, M, Y and K image densities for application of print setting.

Then, the toner consumption rate calculating portion 180 displays each toner consumption rate calculated as described above correspondingly to each preset and in an item of a toner consumption rate displayed on the preset selection screen. For example, a toner consumption rate is displayed correspondingly to the item of the toner consumption rate 433 on the preset selection screen 400 shown in FIG. 7. A toner consumption rate is displayed in the item of the toner consumption rate 620 in the preset selection screen 600 shown in FIG. 9.

Then, a hardware configuration of the image processing apparatus 10 will be described with reference to FIG. 10.

Figure 10:
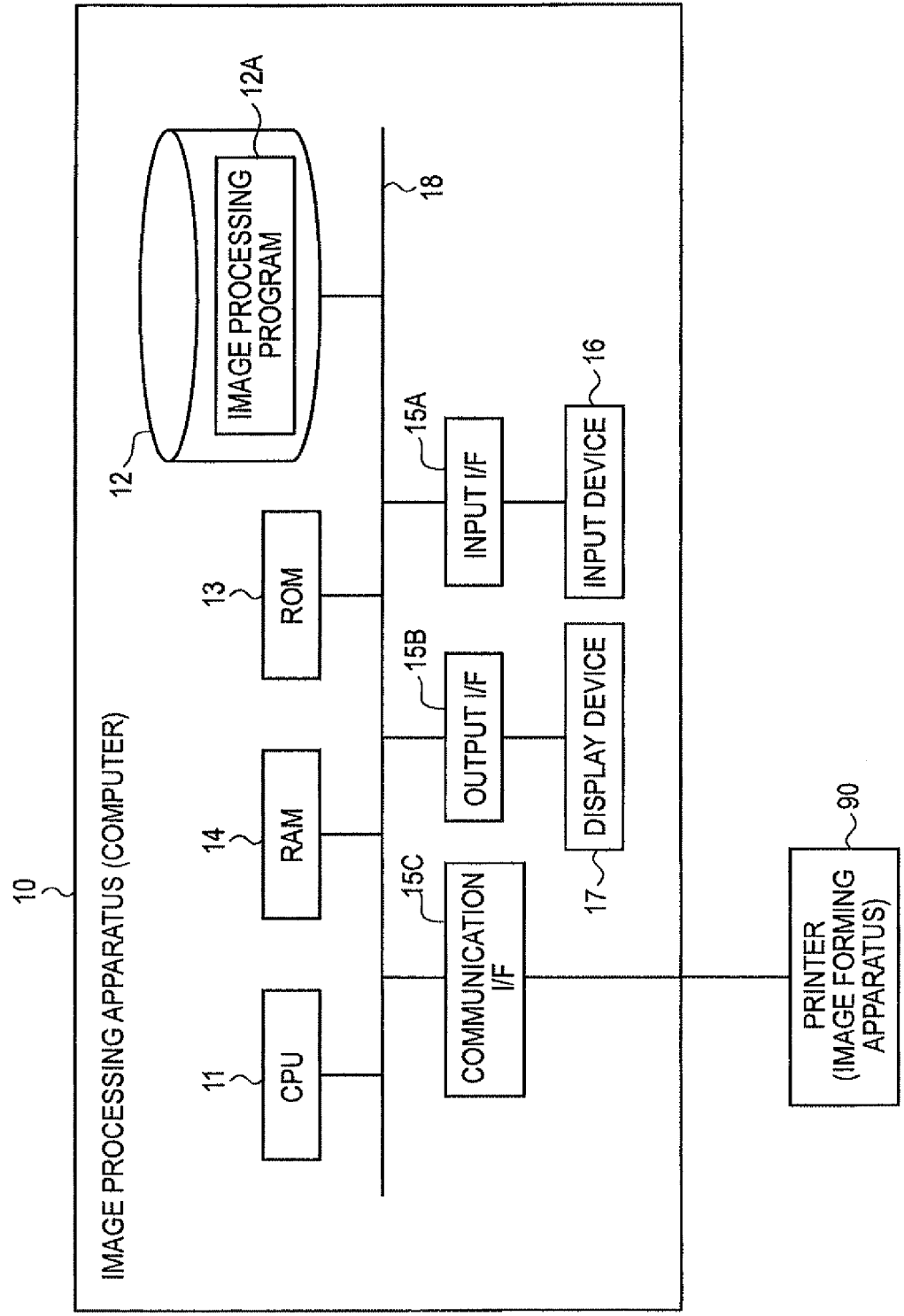
FIG. 10 is a configuration view showing a hardware configuration of the image processing apparatus according to the first embodiment.

As shown in FIG. 10, the image processing apparatus 10 has a CPU 11, a storage device 12, a ROM 13, a RAM 14, an Input I/F 15A, an output I/F 15B, a communication I/F 15C, an input device 16 connected to the input I/F 15A, and a display device 17 connected to the output I/F 15B. The respective constituent elements 11 to 14 and 15A to 15C are connected to a system bus 18.

The storage device 12 is, for example, a hard disk which stores installed programs such as an image processing program 12A, the GUI 103 and the application software 106 shown in FIG. 1, etc.

Figure 5:
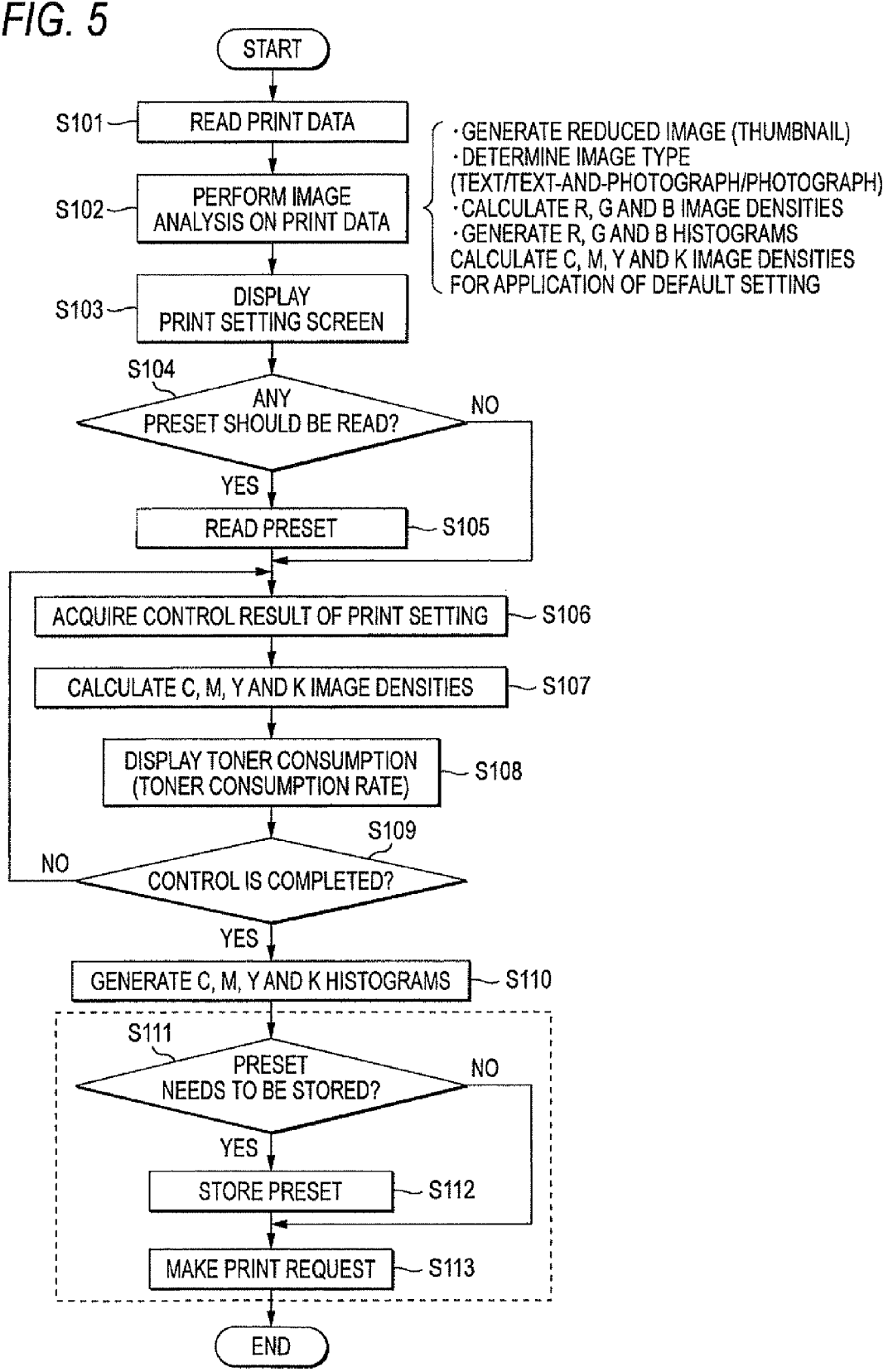
FIG. 5 is a flow chart showing a procedure of a print setting process of the image processing apparatus according to the first embodiment.

The image processing program 12A contains software (programs) for implementing functions of the image processing portion 100 (the constituent elements 110 to 200) shown in FIG. 1 and software (programs) corresponding to the procedure of the print setting process shown in FIG. 5.

The functions of the image processing portion 100 (constituent elements 110 to 200) include the respective functions of the respective constituent elements 121 to 126 of the image analysis portion 120 shown in FIG. 3 and the respective functions of the respective constituent elements 171 to 173 of the change portion 170 shown in FIG. 4.

In the image processing portion 100, the execution portion 140 executes an execution process and the preset storage processing portion 190 executes a storage process.

In addition, the storage device 12 exerts functions of the default print setting information storage portion 101 and the preset storage portion 102 shown in FIG. 1.

The ROM 13 is a read-only memory, which stores expression information corresponding to the expression indicated as Expression 1, expression information corresponding to the expression indicated as Expression 2, communication protocol information for communicating with an external device, etc.

The RAM 14 is a random-access memory, which stores programs (including the GUI 103 and the application software 106) including the image processing program 12A, print data, the expression information, the default print setting information and the communication protocol information. The programs and the print data are read from the storage device 12. The expression information, the default print setting information and the communication protocol information are read from the ROM 13.

In addition, a storage area (work area) required for the image processing portion 100 to perform the processing is allocated in the RAM 14. This work area serves for storing the analysis process performed by the image analysis portion 120, the change process performed by the change portion 170, the midway results and the final result of the respective processes for the toner consumption rate calculating process performed by the toner consumption rate calculating portion 180, the presets read by the preset reading portion 130, the specific preset information and the specific preset corresponding to the specific preset information acquired by the selected preset acquisition portion 150, the result of the image quality control acquired by the image quality control result acquisition portion 160, etc.

The input I/F (input interface) 15A and the output I/F (output interface) 15B are provided with CPUs (central processing units) for executing data communication respectively. The input I/F 15A performs data communication with the input device 16. The output I/F 15B performs data communication with the display device 17. The input device 16 implements the function of the input portion 104 shown in FIG. 1. The display device 17 implements the function of the display portion 105 shown in FIG. 1.

The communication I/F (communication interface) 15C is provided with a CPU (central processing unit) for executing data communication. The communication I/F 15C reads and executes the aforementioned communication protocol information from the ROM 13 to the RAM 14 so as to perform data communication with a printer 90 as an image forming apparatus.

The CPU 11 is a central processing unit, which reads and executes the programs including the image processing program 12A from the storage device 12 to the RAM 14 so as to implement the functions of the respective constituent elements of the image processing portion 100 and implement the processing function corresponding to the image processing program 12A. In addition, the CPU 11 controls the image processing apparatus 10 as a whole.

(Second Embodiment)

An image processing apparatus according to a second embodiment has the same functional configuration as the image processing apparatus (including the image analysis portion 120 shown in FIG. 3 and the change portion 170 shown in FIG. 4) according to the first embodiment as shown in FIG. 1.

In a print setting process performed by an image processing portion 100 according to the second embodiment, processing from the step S101 to the step S110 is the same as that in the print setting process according to the first embodiment as shown in FIG. 5, but processing from the step S111 to the step S113 is altered.

In the second embodiment, a preset storage process will be performed as follows in place of the processing from the step S111 to the step S113.

Figure 11:
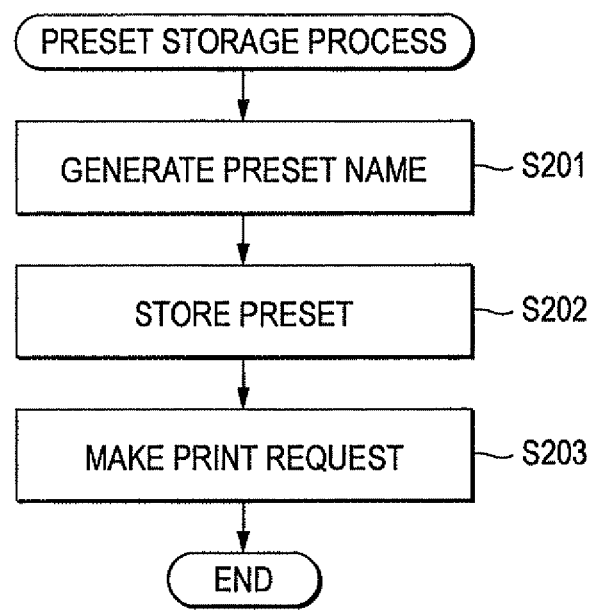
FIG. 11 is a flow chart showing a procedure of a preset storage process performed by an image processing portion of an image processing apparatus according to a second embodiment.

The preset storage process performed by the image processing portion 100 of the image processing apparatus 10 will be described below with reference to FIG. 11.

In the image processing portion 100 which has executed the processing from the step S101 to the step S110, the preset storage processing portion 190 has acquired the print data analysis information (the reduced image, the image type, the R, G and B image densities, the R, G and B histograms, and the C, M, Y and K image densities for application of default setting), the print setting information (the changed print setting information), the toner consumption information (the C, M, Y and K image densities for application of print setting and the C, M, Y and K histograms for application of print setting) and the toner consumption rate. Thus, the print data analysis information, the print setting information, the toner consumption information and the toner consumption rate are set as one preset to be stored.

Then, the preset storage processing portion 190 generates a preset name corresponding to the one preset to be stored, for example, in accordance with predetermined rules (step S201) and stores the one preset to be stored including the generated preset name in the preset storage portion 102 (S202).

Successively, the preset storage processing portion 190 outputs the print setting information in the one preset to be stored and print data to be printed corresponding to the print setting information, to the image output portion 200. The image output portion 200 outputs, as a print job, the print data and the print setting information from the preset storage processing portion 190 to a not-shown printer and makes a print request to the printer (Step S203).

In the second embodiment, reduced images 420 and pieces of image information 430 are displayed on a preset selection screen 400, for example, as shown in FIG. 7, so that a user may refer to the displayed reduced images to select one preset more easily and more visually, compared with the case where the reduced images are not displayed. In other words, it may be said that the user may refer to the reduced images and the pieces of image information displayed on the preset selection screen 400 to select one preset without the necessity of identifying the name of the preset.

However, the system (the image processing portion 100) has to identify the preset. Therefore, the system generates the preset name as one piece of information for identifying the preset, for example, generates (automatically generates) generation day and time (year/month/day/hour/min/sec), a serial number, etc. as the preset name, and stores the generated preset name as one preset in association with the print data analysis information, the print setting information, the toner consumption information and the toner consumption rate.

(Third Embodiment)

An image processing apparatus according to a third embodiment has the same functional configuration as the image processing apparatus 10 (including the image analysis portion 120 shown in FIG. 3 and the change portion 170 shown in FIG. 4) according to the first embodiment as shown in FIG. 1.

In a print setting process performed by the image processing portion 100 according to the third embodiment, the processing from the step S101 to the step S110 is the same as that in the print setting process according to the first embodiment as shown in FIG. 5, but the processing from the step S111 to the step S113 is altered In the third embodiment, a preset storage process is performed as follows in place of the processing from the step S11 to the step S113.

Figure 12:
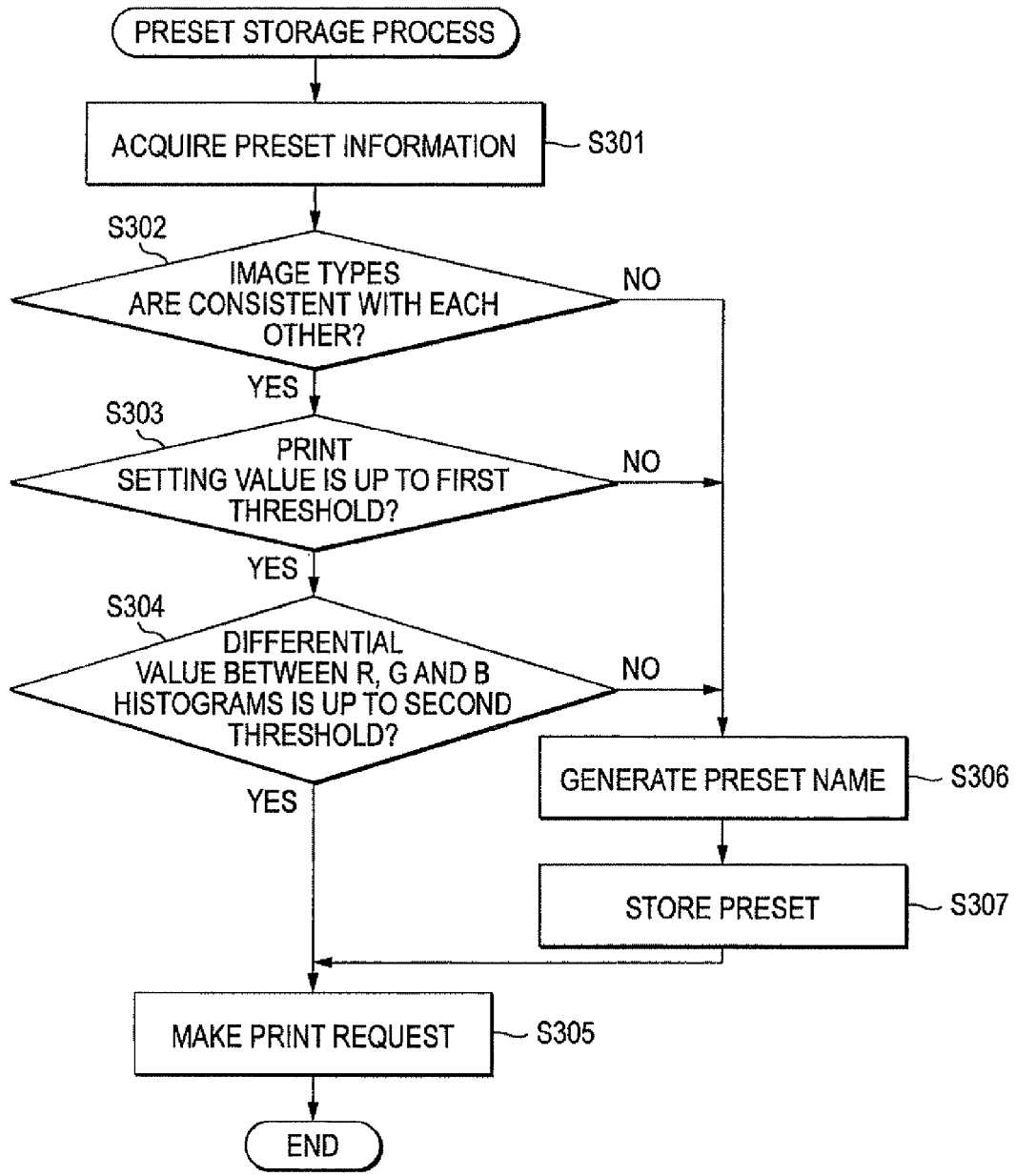
FIG. 12 is a flow chart showing a procedure of a preset storage process performed by an image processing portion of an image processing apparatus according to a third embodiment.

The preset storage process performed by the image processing portion 100 of the image processing apparatus 10 will be described below with reference to FIG. 12.

In the image processing portion 100 which has executed the processing from the step S101 to the step S110, the preset storage processing portion 190 has acquired the print data analysis information (the reduced image, the image type, the R, G and 13 image densities, the R, G and 13 histograms, and the C, M, Y and K image densities for application of default setting), the print setting information (the changed print setting information), the toner consumption information (the C, M, Y and K image densities for application of print setting and the C, M, Y and K histograms for application of print setting) and the toner consumption rate. Thus, the print data analysis information, the print setting information, the toner consumption information and the toner consumption rate are set as one preset to be stored.

Then, the preset storage processing portion 190 acquires all presets read by the preset reading portion 130 (step S301), and sets each of the acquired presets as one preset to be compared.

The preset storage processing portion 190 determines whether image types of the two presets, i.e. the one preset to be stored and the one preset to be compared, are consistent with each other (step S302). When the determination results in that the image types of the two presets are consistent with each other, the preset storage processing portion 190 determines whether a differential value between setting values of the print setting information of the two presets is a value up to a predetermined first value (threshold) or not (step S303).

When the determination in the step S303 results in that the differential value is a value up to the first value (threshold), the preset storage processing portion 190 determines whether a differential value between R, G and B histograms of the two presets is a value up to a second value (threshold) or not (Step S304). When the determination results in that the differential value between the R, G and B histograms of the two presets is a value up to the second value (threshold), the preset storage processing portion 190 determines that the one preset to be stored has the same contents as or approximated contents to the one preset to be compared.

Here, the difference between the R, G and B histograms of the two presets will be described.

Figure 13A:
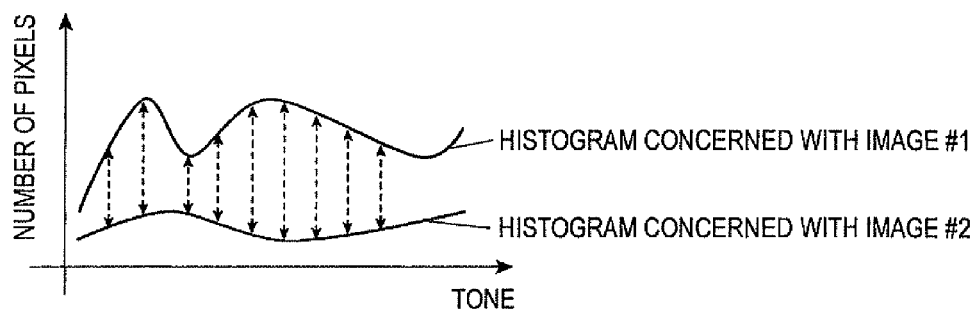
FIGS. 13A and 13B are views for describing a difference between two histograms according to the third embodiment.
Figure 13B:
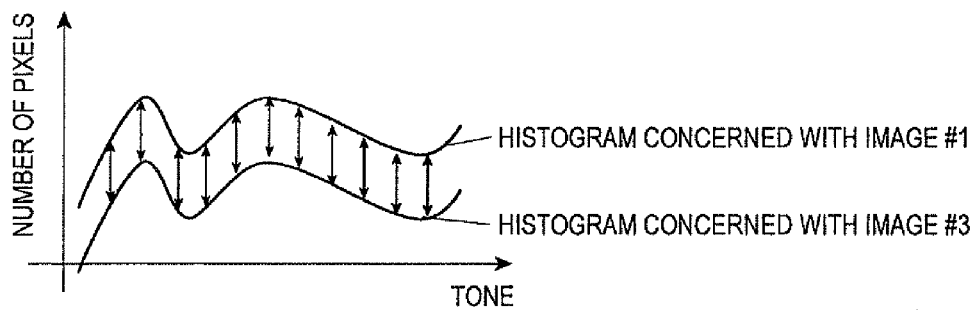

For example, assume that a histogram concerned with a R color image #1 and a histogram concerned with a R color image #2 are shown in FIG. 13A while the histogram concerned with the R color image #1 and a histogram concerned with a R color image #3 are shown in FIG. 13B.

When attention is paid to the R color images on this occasion, a difference value between the histogram concerned with the R color image #1 and the histogram concerned with the R color image #2 is the sum of respective tone differences which are designated by the dotted-line arrows as shown in FIG. 13A.

In addition, when attention is paid to the R color images, a differential value between the histogram concerned with the R color image #1 and the histogram concerned with the R color image #3 is the sum of respective tone differences which are designated by the solid-line arrows as shown in FIG. 13B.

Incidentally, in terms of the examples shown in FIGS. 13A and 13B, the differential value between the two histograms in the example shown in FIG. 13B is smaller than the differential value between the two histograms in the example shown in FIG. 13A.

As described above, the preset storage processing portion 190 determines whether the differential value between the two histograms is a value up to the second threshold or not.

The preset storage processing portion 190 successively performs the respective comparison determination processes of the steps S302 to S304 on all the presets to be compared. When all the determinations in the steps S302 to S304 result in "YES", the preset storage processing portion 190 determines that the one preset to be stored has the same contents as or approximated contents to at least one of all the presets to be compared. The preset storage processing portion 190 does not perform the process of storing the one preset to be stored, but outputs the print setting information in the one preset to be stored and print data to be printed corresponding to the print setting information, to the image output portion 200. The image output portion 200 outputs, as a print job, the print data and the print setting information from the preset storage processing portion 190 to a not-shown printer and makes a print request to the printer (step S305).

The preset storage processing portion 190 successively performs the respective comparison determination processes of the steps S302 to S304 on all the presets to be compared. Assume that the determination in the step S302 results in that the image types of the two presets are not consistent with each other. In this case, when the determination in the step S303 results in that the differential value between the setting values of the print setting information of the two presets exceeds the predetermined first value (threshold), and when the determination in the step S304 results in that the differential value between the R, G and B histograms of the two presets exceeds the second threshold, the preset storage processing portion 190 determines that the one preset to be stored has different contents from all the presets to be compared.

That is, when all the determinations as to all the presets to be compared in the comparison determination processes of the steps S302 to S304 result in "NO", the one preset to be stored is determined to have different contents from all the presets to be compared.

When compassion between the one preset to be stored and each of all the presets to be compared results in determination that the one preset to be stored has different contents from each of all the presets to be compared, as described above, the preset storage processing portion 190 generates a preset name corresponding to the one preset to be stored, for example, in accordance with predetermined rules (step S306) and stores the one preset to be stored including the generated preset name in the preset storage portion 102 (step S307).

After the step S307 is completed, the procedure of processing goes to the step S305.

That is, when any one of all the presets (all the presets to be compared) stored in the preset storage portion 102 has the same contents as or approximated contents to the one preset to be stored, the preset storage processing portion 190 does not store the one preset to be stored in the preset storage portion 102. In this manner, the preset with approximated contents may be prevented from being stored redundantly in the preset storage portion 102.

On the other hand, when any of all the presets (all the presets to be compared) stored in the preset storage portion 102 does not have the same contents as or approximated contents to the one preset to be stored, that is, when the contents of the one preset to be stored are different from the contents of each of all the presets to be compared, the preset storage processing portion 190 stores the one preset to be stored in the preset storage portion 102.

(Fourth Embodiment)

An image processing apparatus according to a fourth embodiment has the same functional configuration as the image processing apparatus 10 (including the image analysis portion 120 shown in FIG. 3 and the change portion 170 shown in FIG. 4) according to the first embodiment as shown in FIG. 1.

In a print setting process performed by the image processing portion 100 according to the fourth embodiment, the processing from the step S101 to the step Silo is the same as that in the print setting process according to the first embodiment as shown in FIG. 5, but the processing from the step S111 to the step S113 is altered.

In the fourth embodiment, a preset storage process will be performed as follows in place of the processing from the step S111 to the step S113.

Figure 14:
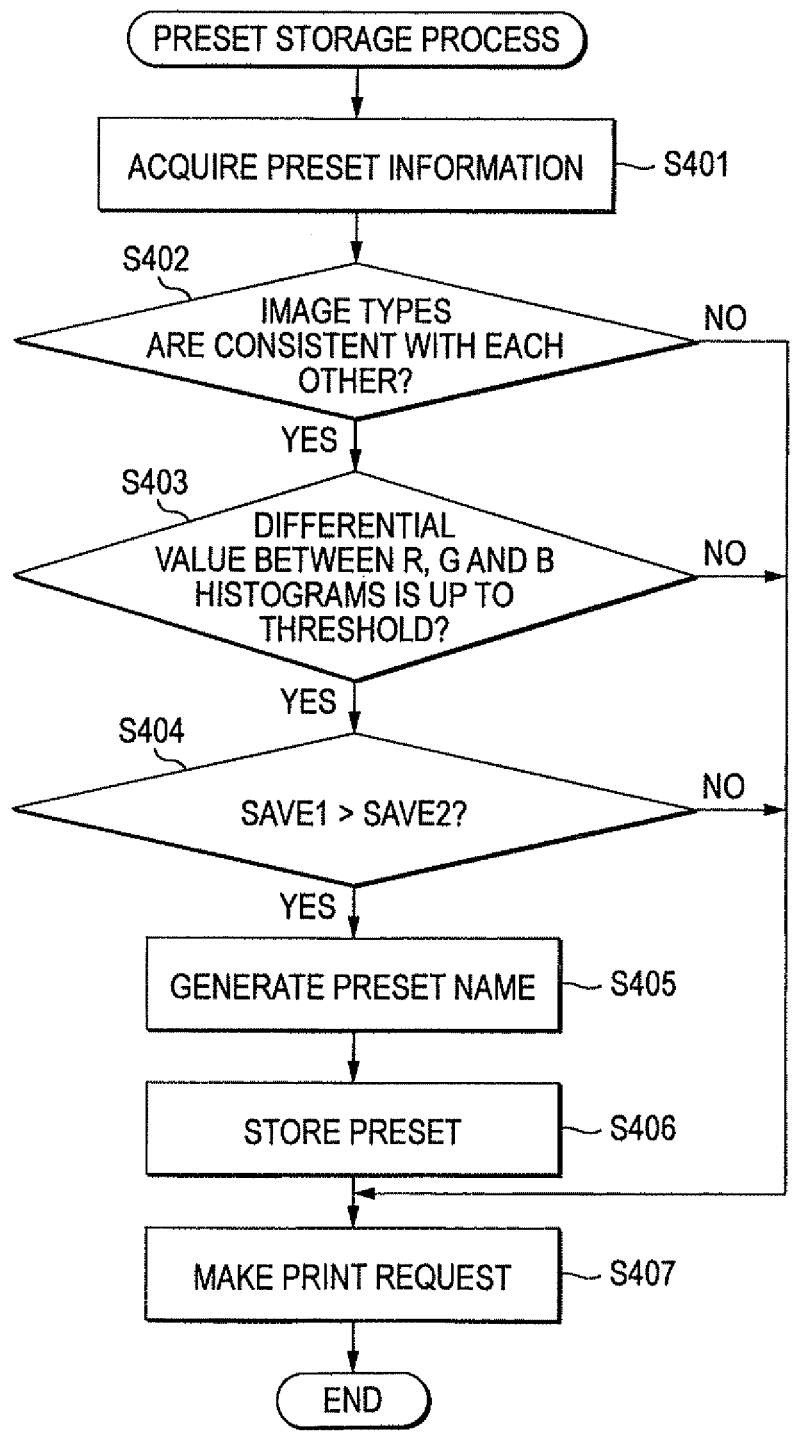
FIG. 14 is a flow chart showing a procedure of a preset storage process performed by an image processing portion of an image processing apparatus according to a fourth embodiment.

The preset storage process performed by the image processing portion 100 of the image processing apparatus 10 will be described below with reference to FIG. 14.

In the image processing portion 100 which has executed the processing from the step S101 to the step S110, the preset storage processing portion 190 has acquired the print data analysis information (the reduced image, the image type, the R, G and B image densities, the R, G and B histograms, and the C, M, Y and K image densities for application of default setting), the print setting information (the changed print setting information), the toner consumption information (the C, M, Y and K image densities for application of print setting and the C, M, Y and K histograms for application of print setting) and the toner consumption rate. Thus, the print data analysis information, the print setting information, the toner consumption information and the toner consumption rate are set as one preset to be stored.

Then, the preset storage processing portion 190 acquires all presets read by the preset reading portion 130 (step S401) and sets each of the acquired presets as one preset to be compared.

The preset storage processing portion 190 determines whether image types of the two presets, i.e. the one preset to be stored and the one preset to be compared are consistent with each other or not (step S402). When the determination results in that the image types of the two presets are consistent with each other, the preset storage processing portion 190 determines whether a differential value between R, G and B histograms of the two presets is a value up to a predetermined value (threshold) or not (step S403). When the determination results in that the differential value between the R, G, and B histograms of the two presets is a value up to the threshold, the preset storage processing portion 190 determines whether a relational expression "(Toner Consumption Rate=Save1)> (Toner Consumption Rate=Save2)" is established or not (step S404).

Here, Save1 indicates a toner consumption rate (a stored preset) contained in the preset to be compared acquired from the preset reading portion 130 in the step S401. In addition, Save2 indicates a toner consumption rate (a toner consumption rate corresponding to the preset to be stored) calculated by the toner consumption rate calculating portion 130.

Assume that the determination in the step S402 results in that the image types of the two presets are consistent with each other. In this case, when the determination in the step S403 results in that the differential value between the R, G and B histograms of the two presets is a value up to the threshold, and when the determination in the step S404 results in that the relational expression is established, the preset storage processing portion 190 determines that the toner consumption rate of the one preset to be stored is smaller than the toner consumption rate of the one preset to be compared.

The preset storage processing portion 190 successively performs the respective comparison determination processes of the steps S402 to S404 on all the presets to be compared. When all the determinations as to all the presets to be compared in the steps S402 to S404 results in "YES", the preset storage processing portion 190 determines that the toner consumption rate of the one preset to be stored is smaller than any of the toner consumption rates of all the presets to be compared.

When the determination results in that the toner consumption rate of the one preset to be stored is smaller than any of the toner consumption rates of all the presets to be compared, as described above, the preset storage processing portion 190 generates a preset name corresponding to the one preset to be stored, for example, in accordance with predetermined rules (step S405) and stores the one preset to be stored including the generated preset name in the preset storage portion 102 (step S406).

Then, the preset storage processing portion 190 outputs the print setting information in the one preset to be stored, and print data to be printed corresponding to the print setting information, to the image output portion 200. The image output portion 200 outputs, as a print job, the print data and the print setting information from the preset storage processing portion 190 to a not-shown printer and makes a print request to the printer (step S407).

Incidentally, assume that the determination in the step S402 results in that the image types of the two presets are not consistent with each other. In this case, when the determination in the step S403 results in that the differential value between the R, G and B histograms of the two presets exceeds the threshold, or when the determination in the step S404 results in that the relational expression is not established, the procedure of processing goes to the step S407.

That is, when the toner consumption rate of the one preset to be stored is smaller than any of the toner consumption rates of all the presets (all the presets to be compared) stored in the preset storage portion 102, the preset storage processing portion 190 stores the toner consumption rate of the one preset to be stored in the preset storage portion 102.

The invention made by the present inventor has been described specifically based on the embodiments. It should be noted that the embodiments disclosed in the specification are shown simply by way of example in all respects and not limited to the disclosed techniques. That is, the technical scope of the invention should not be interpreted in a limited manner based on the description in the embodiments but should be interpreted in accordance with the scope of claims. The technical scope of the invention should include all changes without departing from techniques equivalent to the techniques described in the scope of claims and the gist of the scope of claims.

When a program is used, the program may be provided through a network or the program may be stored and provided in a storage medium such as a CD-ROM.

That is, the invention is not limited to the case where a program including the image processing program is stored in a storage device such as a hard disk, the program may be provided as follows.

For example, the program may be stored in a ROM in advance and the CPU may load the program from the ROM to a main storage device and execute the program.

The program may be stored and distributed in a computer-readable storage medium such as a DVD-ROM, a CD-ROM, an MO (Magneto-Optical disk), a flexible disk, etc.

Further, the image processing apparatus etc. may be connected to a server apparatus or a host computer through a communication line (e.g. the Internet) so that the program may be downloaded from the server apparatus or the host computer and then executed. In this case, for example, the program may be downloaded to a memory such as a RAM or a storage device (storage medium) such as a hard disk.

The image processing apparatus according to the invention may be applied to an image processing apparatus which transmits print data to an image forming apparatus for forming an image by toner (an electrophotographic process type image forming apparatus) or an image forming apparatus for forming an image by ink (an inkjet type image forming apparatus).

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a storage unit that stores image formation information in which print setting information is associated with an index useful in deciding to suppress consumption of a recording material; and
an execution unit that executes a process of displaying one or more pieces of the image formation information stored in the storage unit on a display unit in association with print data to be printed;
a first acquisition unit that acquires a specific piece of image formation information selected by a user from the one or more pieces of the image formation information displayed on the display unit;
a second acquisition unit that acquires an image quality control result of image quality control made by the user on the print data to be printed;
a change unit that changes the specific piece of image formation information acquired by the first acquisition unit based on the image quality control result acquired by the second acquisition unit; and
a processing unit that stores the specific piece of image formation information in the storage unit in association with the print data to be printed, when the changed specific piece of image formation information satisfies predetermined storage conditions.

2. An image processing apparatus according to claim 1, wherein:
the predetermined storage conditions include that the image formation information to be stored and the one or more pieces of the image formation information stored in the storage unit do not have the same contents or approximated contents.

3. An image processing apparatus according to claim 1, wherein:
the index includes information obtained by analyzing the print data related to the print setting information contained in the image formation information and information about consumption of the recording material.

4. An image processing apparatus according to claim 3, wherein:
the information obtained by analyzing print data includes information about the print data related to the print setting information contained in the image formation information, that is, any one of information of a reduced image where an image has been reduced, image type information indicating the type of the image, information of an image density about each color image of the image in an RGB color space, information of a histogram about each color image of the image in the RGB color space, and information of an image density about each color image of the image in a CMYK color space when setting information with default settings for printing is applied to the print data.

5. An image processing apparatus according to claim 3, wherein the information about the consumption of the recording material includes any one of information of an image density about each color image of an image in a CMYK color space when the print setting information is applied to the print data related to the print setting information, and information of a histogram about each color image of the image in the CMYK color space when the print setting information is applied to the print data related to the print setting information.

6. An image processing apparatus comprising:
a storage unit that stores image formation information in which print setting information is associated with an index useful in deciding to suppress consumption of a recording material; and
an execution unit that executes a process of displaying one or more pieces of the image formation information stored in the storage unit on a display unit in association with print data to be printed;
an acquisition unit that acquires an image quality control result of image quality control made by a user on the print data to be printed;
a generation unit that generates the index related to the print setting information and the print data to be printed, based on the image quality control result acquired by the acquisition unit; and
a processing unit that stores image formation information including the generated print setting information and the generated index associated with each other, in the storage unit in association with the print data to be printed, when the image formation information satisfies predetermined storage conditions.

7. A non-transitory computer readable medium storing a program causing a computer to execute a process for forming an image, the process comprising:
storing, in a storage unit, image formation information in which print setting information is associated with an index useful in deciding to suppress consumption of a recording material;
executing a process of displaying one or more pieces of the image formation information stored in the storage unit on a display unit in association with print data to be printed;
acquiring a specific piece of image formation information selected by a user from the one or more pieces of the image formation information displayed on the display unit
acquiring an image quality control result of image quality control made by the user on the print data to be printed;
changing the specific piece of image formation information based on the image quality control result; and
storing the specific piece of image formation information in the storage unit in association with the print data to be printed, when the changed specific piece of image formation information satisfies predetermined storage conditions.

8. A non-transitory computer readable medium storing a program causing a computer to execute a process for forming an image, the process comprising:
storing, in a storage unit, image formation information in which print setting information is associated with an index useful in deciding to suppress consumption of a recording material;
executing a process of displaying one or more pieces of the image formation information stored in the storage unit on a display unit in association with print data to be printed;
acquiring an image quality control result of image quality control made by a user on the print data to be printed;
generating the index related to the print setting information and the print data to be printed, based on the image quality control result acquired by the acquisition unit; and
storing the image formation information including the generated print setting information and the generated index associated with each other, in the storage unit in association with the print data to be printed, when the image formation information satisfies predetermined storage conditions.

* * * * *